(12) United States Patent
Salomon et al.

(10) Patent No.: US 7,680,803 B2
(45) Date of Patent: Mar. 16, 2010

(54) OPEN CONTENT INTERFACE FOR EH&S SYSTEMS

(75) Inventors: Thomas Salomon, Rauenberg (DE); Wolfgang Ambrosch, Friedrichshafen (DE)

(73) Assignee: SAP Aktiengesellschaft, Walldorf (DE)

( * ) Notice: Subject to any disclaimer, the term of this patent is extended or adjusted under 35 U.S.C. 154(b) by 1208 days.

(21) Appl. No.: 10/873,747

(22) Filed: Jun. 21, 2004

(65) Prior Publication Data

US 2005/0283374 A1  Dec. 22, 2005

(51) Int. Cl.
*G06F 17/30* (2006.01)
(52) U.S. Cl. .............................. 707/100; 707/2; 707/102
(58) Field of Classification Search ....................... 707/1, 707/2, 100, 102, 4, 10
See application file for complete search history.

(56) References Cited

U.S. PATENT DOCUMENTS

| | | | |
|---|---|---|---|
| 6,549,922 B1* | 4/2003 | Srivastava et al. | 707/205 |
| 6,581,062 B1* | 6/2003 | Draper et al. | 707/100 |
| 2005/0278644 A1* | 12/2005 | Greaves et al. | 715/760 |
| 2006/0080347 A1* | 4/2006 | Potts et al. | 707/101 |

OTHER PUBLICATIONS

Import and Export Tools: Data and Functions for the SAP component *Environment, Health and Safety*, [online] Retrieved from the Internet: <URL:http://help.sap.com/saphelp_erp60_sp/helpdata/en/c1/eda0f591ec12408b25e7a1b369ca45/frameset.htm>, [retrieved on Sep. 30, 2009], (c) 2008 SAP, 30 pgs.

* cited by examiner

*Primary Examiner*—Cheryl Lewis
(74) *Attorney, Agent, or Firm*—Fish & Richardson P.C.

(57) ABSTRACT

Methods and apparatus for providing an open content interface from importing EH&S data. The invention provides a computer-implemented method that includes: receiving a first input specifying a substance described in a database of an EH&S system; identifying product data available for the substance, the identifying being based on information stored in a first XML file; generating and displaying a data tree that indicates the product data available for the substance, wherein information stored in the first XML file is used to generate the data tree; receiving a second input selecting which of the product data is to be imported to the database of the EH&S system; retrieving the product data from second XML file that includes the product data; using mapping information stored in a third XML file to map the product data retrieved into a data format supported by the EH&S system; and storing the mapped product data.

26 Claims, 12 Drawing Sheets

```
<identifiers>
    <region2 Label="EU">
      <identifier Label="Annex Name">
        <Name ID="OTHERS" UserID="AnnexI"/>
        <Source Code="EEC_67_548" Label="EU Annex I">
          <Description Language="DE">EU Anhang I</Description>
        </Source>
      </Identifier>
    </region2>
</Identifiers>
<Property ID="SAP_EHS_1023_001" Label="Labelling">
  <region1 Label="EU">
    <Source Code="EEC_67_548" Label="EU Annex I">
      <Description Language="DE">EU Anhang I</Description>
    </Source>
  </region1>
  <Description Language="DE">Kennzeichnung</Description>
</Property>
```

FIG. 8a

```
<substance ID="50-00-0" DD="30" MM="09" YYYY="2003">
    <SubName>Formaldehyd</SubName>
    <url>EUAnnexI-50-00-0.xml</url>
</substance>
```

FIG. 8b

EH&S Mapping XML

<Identifier RegulatoryList="YES">
          <Name ID="AnnexI" EhsID="AnnexI" Description="Annex I Name"/>
     </Identifier>
          <Record ID="SAP_EHS_1023_001" EhsID="SAP_EHS_1023_001" Options="/USAGE=PUBLIC,REG_EU" Description="Labelling">
               <Fact ID="SAP_EHS_1023_001_REG_BASE" EhsID="SAP_EHS_1023_001_REG_BASE" Description="Regulatory basis" Type="PHRASE" />
               <Fact ID="SAP_EHS_1023_001_BASE" EhsID="SAP_EHS_1023_001_BASE" Description="Regulatory list" Type="TEXT"/>
     </Record>
     <Phrase ID="CED-N03.00900620" EhsID="CUST-N03.00900620" />
     <Phrase ID="CED-N03.00900640" EhsID="CUST-N03.00900640" />

FIG. 9a

```
<Identifier DD="30" MM="09" YYYY="2003">
         <Name ID="OTHERS" User ID="ANNEXI"
Language="DE">Formaldehyd</Name>
         <Usage>
                  <Rating Value="PUBLIC">
                           <Area>
                                    <Region Code="REG_EU"/>
                           </Area>
                  </Rating>
         </Usage>
         <Source Code="EEC_67_548">EU Annex 1</Source>
</Identifier>
<Property ID="SAP_EHS_1023_001" Label="Labelling">
         <Instance UniqueID="SAP_EHS_1023_001-001"
Active="YES" Relevant="YES" LitSource="EU ANNEXI" DD="30" MM="09", YYYY="2003">
                  <Fields>
                           <Phrases
ID="SAP_EHS_1023_001_R_PHRASE" Label="R phrases">
                                    <Phrase
Key="CUST-N15.00309820"/>
                                    <Phrase
Key="CUST-N15.00309540"/>
                           </Phrases>
                  </Fields>
                  <Usage>
                           <Rating Value="PUBLIC">
                                    <Area>
                                             <Region Code="REG_EU"/>
                                    <Area>
                           </Rating>
                  </Usage>
                  <Source Code="EEC_67_548">EU Annex 1</Source>
         </Instance>
</Property>
```

FIG. 10

OPEN CONTENT INTERFACE FOR EH&S SYSTEMS

BACKGROUND

The present invention relates to data processing by digital computer, and more particularly to Environment, Health and Safety (EH&S) systems.

In EH&S systems, for example, the EH&S system of SAP R/3, available from SAP AG of Walldorf, Germany, users can use one or more databases that include data describing various products used in the productions of life science and healthcare products. Such data will be referred to in the present specification as product data. Product data can include, for example, regulations and laws concerning the products and it ingredients. Product data can specify the legal requirements for the use of certain products, including, for example, handling requirements, storage requirements, and transport requirements. Product data can further include, for example, United Nations (UN) list substances and classification, physical and chemical characteristics of products, safety information for products, and hazardous material management data for products. Additional restrictions and information for certain products can be included.

An enterprise that uses EH&S products, for example, hazardous materials, typically need updated product data to ensure not only the safe use of the product but also compliance with the governing regulations. The enterprise will typically obtain product data from content providers, which include companies providing product data for EH&S products. The content providers usually send the product data to the enterprise through customized interfaces because the content providers usually store the product data in a data format that can differ from the data format supported by the EH&S system of the enterprise. The enterprise typically imports product data from various content providers into their databases. To allow data import from various content providers, various customized data interfaces are needed.

These interfaces can be hardware or software implemented. The interfaces provide communication between the EH&S middleware and the content providers. The interface needs to support each data format of the imported product data. Mapping of data from a content provider into the database format needs to be programmed for each respective data format. The mapping can require, for instance, assigning external product identifications (IDs) from content providers to internal product IDs of the database. Further, IDs of properties, characteristics, identifiers and/or phrases for products needs to be mapped from external to internal.

When receiving data from various content providers, a user (usually an employee of the enterprise) does not know which data is available and which data is to be include into the enterprise's EH&S system. The user needs to select from the available data and specify which of the product data available from the content provider to retrieve and map into the database. However, with different data formats for different content providers, a user interface enabling to select data is difficult to implement. The technical problem lies in the various data formats for product data.

Supporting various content providers also results in a high programming load. The technical problem of supporting various data formats of various content providers lies in the requirement of mapping programs for each data format. A further technical problem lies in the programming load to support changes in the data format of content providers. Another technical problem lies in the fact, that supporting various data formats is error prone.

SUMMARY

The present invention provides methods and apparatus, including computer program products, for providing an open content interface for EH&S systems.

In general, in one aspect, the invention provides a computer-implemented method for importing product data into a database. The database stores the product data in a database specific first data format, and the product data is available from a variety of content providers in a content provider specific second data format. The method includes: providing the second data format to an importing interface; analyzing the second format within the import interface; receiving the product data from the content provider within the import interface of the database; and importing the product data into the database using the mapping rules of the received product data.

Implementations can provide any combinations of the following features. The content provider can provide the mapping interface with information concerning the data format provided by the content provider. Within the mapping interface, which can be a front-end to a EH&S core system that includes a middleware application and a back-end database, the data format of the content provider can be analyzed. The information about the data format can be provided within a mapping XML file.

The interface can translate a second data format into a first data format, e.g., translating between external and internal IDs. The interface can be an open content connector (OCC). The interface facilitates the importing of any product data, including data relating to EH&S products, from different content providers. The content providers can provide product data of different substances. The product data can be imported from the content provider's online services or from off-line media.

The product data can be stored in an XML file in an XML data format. The OCC can parse and analyze the XML file. The OCC can map the XML data format to a data format supported by the EH&S system. The product data can be imported during an initial import, during an updating of already existing content, for example, after load alterations, while importing new content, or while importing data from different content providers.

The interface provides flexibility and control over how complex legal compliance requirements, and product data changes, applicable to the products available in the database, can be imported and represented in the database of the EH&S system.

When receiving the data format of a content provider for a first time, mapping rules for mapping the second data format into the first data format can be generated. The mapping rules can, for instance, define which external IDs are mapped onto which internal IDs. The mapping rules can, for instance, be generated from a mapping XML file received from the content provider providing mapping information.

Having generated mapping rules, the interface can certify the second data format. When receiving data having the second data format, the product data can be imported using the generated mapping rules. The generated mapping rules can ensure that data is imported correctly.

The content provider can provide a file specifying the available content of the content provider. For instance, the content provider can provide a header XML file that includes information specifying what product data is available for import. The interface can use the header XML file to determine the product data that is available from the content provider. In addition, the header XML file can include generic information about the available content, by way of example, meta data describing properties, identifiers, and regulatory list sources.

Having received the file comprising the available content from the content provider, the interface can generate and provide a user dialog. The interface can display a tree structure, which indicates the available product data and which the interface dynamically generates from the content of the received header XML file. The tree structure can display pre-selected filter options. (A filter can specify, for example, what product data one wishes to import and the format of such data.) The tree structure displayed can be configured to always show the default filter settings, which can be applied for any substance and need not be limited in applicability to particular substances. That is, the default setting can be a generic filter.

Substance-specific filters can be implemented. A substance-specific filter is one that is applied for one or more particular substances. A tree structure for selecting certain product data for a selected product can be presented to the user. This tree structure can include a selection of regulatory data for the particular product. It can also be possible to show a pre-defined selection of data in case the product was not loaded before or the last user selection for this product was not saved. The dynamic filter dialog can display the provided identifiers and properties, which can be grouped by regions or regulatory lists. The dialog can be implemented using data received from the content provider, for instance within a header XML file.

In general, in another aspect, the invention provides a generic and extensible interface for importing product data into a database, wherein the database stores the product data in a database specific first format, and wherein the product data is available from a variety of content providers storing the product data in a second format. The interface includes one or more header files that include meta data about the product data and a list of available product data from the content provider. The interface includes one or more content file that includes product data for one product. The interface includes mapping rules for mapping the second format into the first format based on the analyzing results. The mapping rules are not hardcoded in the source code of the interface. The mapping rules are represented by data that can be stored in files, for example, XML files.

In general, in another aspect, the invention provides a computer system configured for importing product data. The system includes a database for storing the product data in a database specific first format. The system includes a generic and extensible interface connected to the database and configured for receiving the product data from one or more content providers. The product data has a second data format that is different than the first data format. The interface is configured to analyze the second format, generate mapping rules for mapping the second format into the first format, receive the product data from the content provider within the import interface of the database, and import the product data into the database using the mapping rules for the data format of the received product data.

In general, in another aspect, the invention provides a computer program product for importing product data into a database. The product data is stored in a database specific first format. The program includes instructions operable to cause a processor to receive the product data from a variety of content providers in a content provider specific second format within an importing interface of the database, analyze the second format within the import interface, receive the product data from the content provider within the import interface of the database, and import the product data into the database using the mapping rules for the data format of the received product data.

The product data can be product data of substances, pharmaceuticals, chemicals, safety information, hazardous material management data, list substances, and/or regulatory content into a database.

The invention can be implemented to realize one or more of the following advantages. An enterprise can import data from additional content providers without having to reprogram the interface for importing data. New mapping definitions can be added without having to reprogram the interface. An indication of the available product data can be dynamically generated. Filters can be dynamically generated based on such an indication and on user input. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

FIGS. 8*a* and 8*b* show examples of the content of a header XML file.

FIG. 9*a* shows an example of the content of a mapping XML file.

FIG. 10 shows example content of a content XML file.

Like reference numbers and designations in the various drawings indicate like elements.

DETAILED DESCRIPTION

Figure 1:
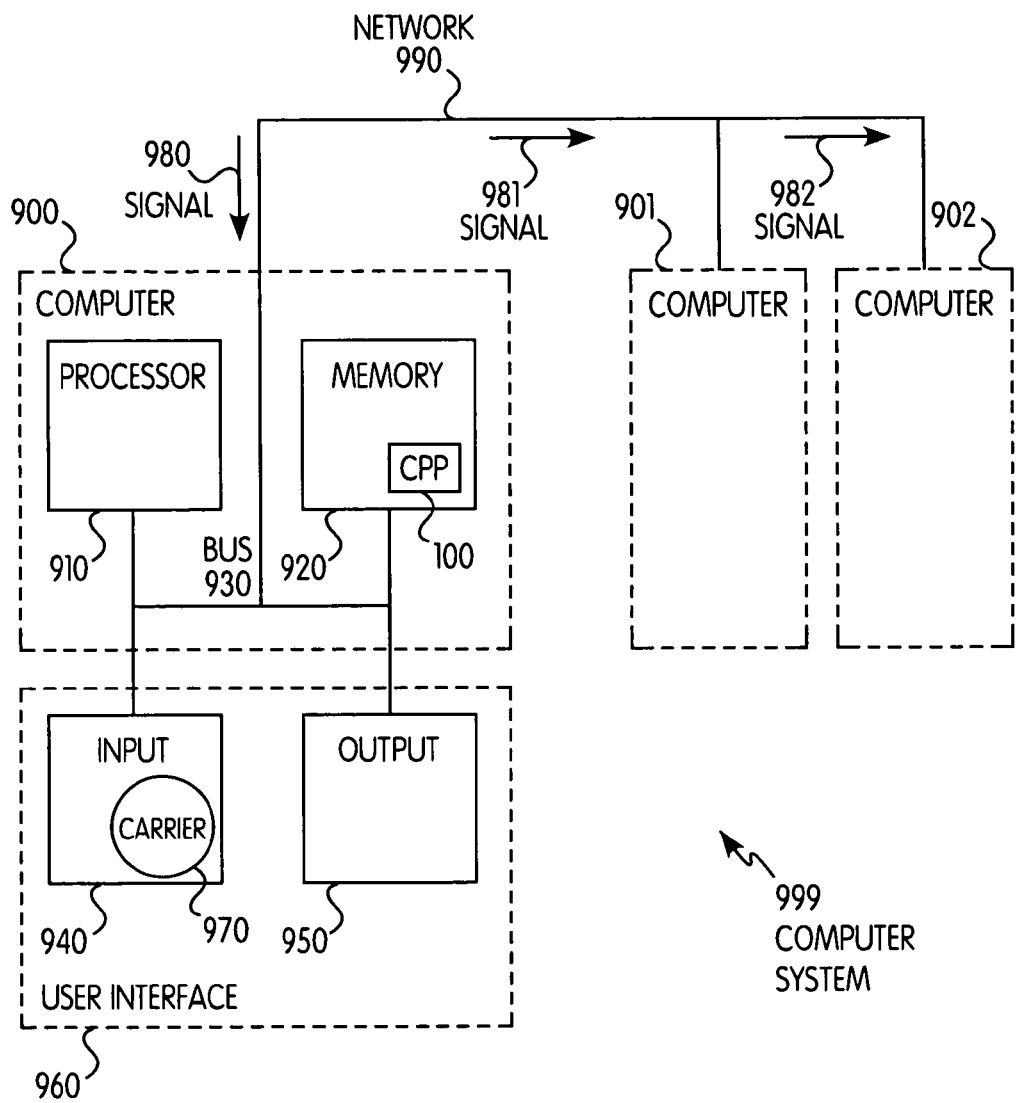
FIG. 1 shows a computer system for implementing the inventive method.

In FIG. 1 reference numbers 100/200, 110/210 . . . denote similar elements, the function of these elements can be different FIG. 1 illustrates a simplified block diagram of exemplary computer system 999 having a plurality of computers 900, 901, 902 (or even more).

Computer 900 can communicate with computers 901 and 902 over network 990. Computer 900 has processor 910, memory 920, bus 930, and, optionally, input device 940 and output device 950 (I/O devices, user interface 960). As illustrated, the invention is implemented by computer program product 100 (CPP), carrier 970 and signal 980. In respect to computer 900, computer 901/902 is sometimes referred to as "remote computer", computer 901/902 is, for example, a server, a peer device or other common network node, and typically has many or all of the elements described relative to computer 900.

Computer 900 is, for example, a conventional personal computer (PC), a desktop device or a hand-held device, a multiprocessor computer, a pen computer, a microprocessor-based or programmable consumer electronics device, a mini-computer, a mainframe computer, a personal mobile computing device, a mobile phone, a portable or stationary personal computer, a palmtop computer or the like. Processor 910 is, for example, a central processing unit (CPU), a micro-controller unit (MCU), digital signal processor (DSP), or the like.

Memory 920 is elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick.

Optionally, memory 920 is distributed. Portions of memory 920 can be removable or non-removable. For reading from media and for writing in media, computer 900 uses well-known devices, for example, disk drives, or tape drives.

Memory 920 stores modules such as, for example, a basic input output system (BIOS), an operating system (OS), a program library, a compiler, an interpreter, and a text-processing tool. Modules are commercially available and can be installed on computer 900. For simplicity, these modules are not illustrated.

CPP 100 has program instructions and—optionally—data that cause processor 910 to execute method steps of the present invention. In other words, CPP 100 can control the operation of computer 900 and its interaction in network system 999 so that is operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture having a computer readable medium with computer readable program code to cause the computer to perform methods of the present invention. Further, signal 980 can also embody computer program product 100.

Having described CPP 100, carrier 970, and signal 980 in connection with computer 900 is convenient. Optionally, further carriers and further signals embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), a counter (e.g., a goods counter in a factory). Input device 940 can serve to read carrier 970.

Output device 950 presents instructions and data that have been processed. For example, this can be a monitor or a display, (cathode ray tube (CRT), flat panel display, liquid crystal display (LCD), speaker, printer, plotter, vibration alert device. Output device 950 can communicate with the user, but it can also communicate with further computers.

Input device 940 and output device 950 can be combined to a single device. Any device 940 and 950 can be provided optional.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways which are computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., world wide web WWW). Network 990 can be a wired or a wireless network. To name a few network implementations, network 990 can be, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

A variety of transmission protocols, data formats and conventions is known, for example, as transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), Standard Generalized Markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

Figure 2:
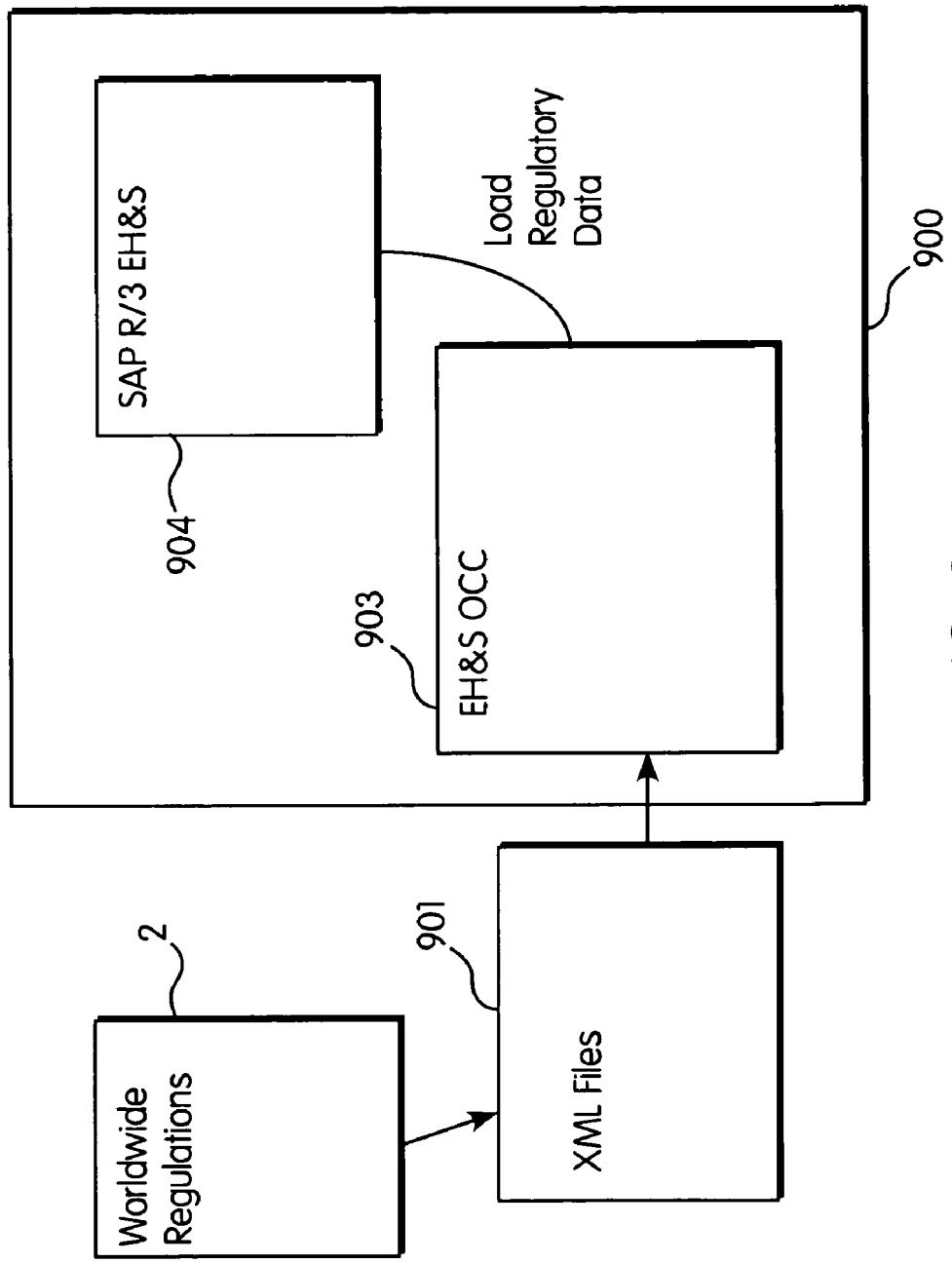
FIG. 2 shows heterogeneous computer systems of a content provider and an enterprise's EH&S system.

FIG. 2 shows a system 901 of a content provider and an EH&S system 900. EH&S system 900 include an SAP R/3 EH&S core system 904, which can be implemented within a middleware product, connecting a database back-end and an application front-end. The EH&S system includes an open content connector (OCC) 903.

The systems 901 and 900 can be heterogeneous systems. They can store data in different formats. The OCC is generally an interface that can be generic. That is, the OCC can import product data from different content providers. The mapping definitions that the OCC uses to map one data format to another are not hardcoded into the source code of the interface. In one implementation, they are stored in XML files called EH&S mapping XML. New mapping definitions can be added to the OCC without requiring a reprogramming of the OCC's source code. In this sense, the OCC is extensible. The EH&S mapping can be provided and distributed by the content provider.

The OCC includes information that describes what product data is available from content providers. This data describes the scope of content available from a content provider. The data can include, for example, metadata about properties of substances, identifiers and regulatory list sources, a list of substances for which product data is available, and pointers or links to information that describe each of these substances.

In one implementation, such data is stored in XML files called header XML. The header XML file includes two sections. A first section describes the available content, from which the OCC can determine which properties of a substance are listed and which regulations apply to the substance. A second section describes the substances for which the content provider has available product information. The header XML files can be provided and distributed by the content provider.

The OCC can use information from header XML files to generate and display, in a filter dialog, a dynamic tree that indicates, for a substance, identifiers and properties grouped by regulations and regulatory lists. The OCC can receive user input and generate a filter based on the user input. The filter imports only product data that is not filtered out. The filter dialog is further described below.

The OCC can include product data that relates to and describes a substance listed in the EH&S system. Generally, the product data is imported from one or more content providers.

As described above, the content provider 901 can generate and provide product data 2 for various products. Product data can, for example, be data of substances, pharmaceuticals, chemicals, safety information, hazardous material management information, UN-list substances, regulatory content, or any other information relevant for using the respective materials. The product data is stored within the content provider in a particular data format that can be different from the data format of the EH&S system. This specific data format can, for instance, be an XML-file structure.

When importing product data from content provider 901 to EH&S core system 904, open content connector 903 can receive from content provider 901 content data. For instance, the OCC 903 can receive the above-described mapping XML file. This mapping XML file can be analyzed and mapping rules generated. These rules provide mapping data of the content provider specific data structure into a data structure which is supported by the EH&S core system 904.

Thereafter, the above-described header XML file can be received within the OCC 903. As discussed, the header XML file can include metadata for products and a section listing links to the product data, e.g., a link to a content XML file stored within a database of the content provider and available via a network connection.

When the mapping XML file has been analyzed in OCC 903, mapping rules are generated. When importing product data, for instance, for updating already existing data sets, or importing new content, the content provider 901 is requested to provide available data, for instance by using a header XML file and a content XML file. By parsing the received data, in particular the content XML file, available product data can be identified and presented to a user for user selection.

To allow a user to select from the available data, which will be imported and then mapped onto the product data of the EH&S core system 904, a filter dialog can be presented.

The filter dialog can be dynamically generated from the files received from the content provider. The content provider can provide the OCC 903 with a header XML file. For initiating the content load process, in particular prior to loading the content XML file, it can be possible to pre-select a default scope of properties, identifiers, regions and regulatory lists. Alternatively, a user can set these filters manually for each run. The user selection can be generated from the header XML file, which can include meta data and data about available products.

When there is one single substance selected in the EH&S System, a dialog can be generated and displayed. The dialog facilitates user selections specifying, for example, which kind of regulatory information is to be imported. Initially the dialog can show a pre-defined default selection from the header XML file, for instance, in case the substance was not loaded before or the last user selection for this particular substance was not saved.

In addition, the filter dialog can be configured to always come up with the default filter selection ignoring any substance-specific filters. The filter dialog can also be a dynamic tree displaying the provided identifiers and properties grouped by regions and regulatory lists. This information can be taken from the header XML file and used for generating the user dialog. The user dialog is generated with the information from the header XML file. A checkbox can allow the user to select all data or only data which has changed since the last load.

Substance-specific filters can be stored in a mapping database. A separate database can also be used for that to avoid conflicts between multiple users in a central mapping database.

Figure 3:
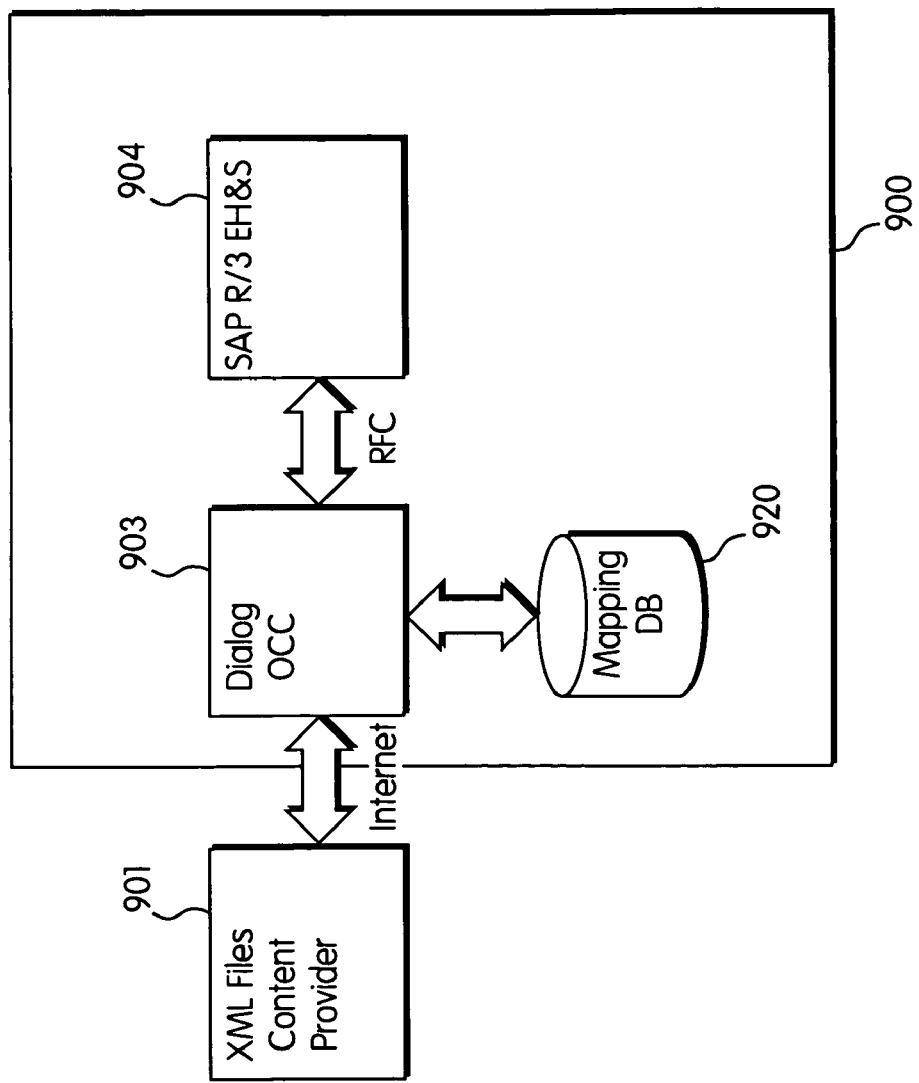
FIG. 3 shows other heterogeneous computer systems of a content provider and an enterprise's EH&S system.

FIG. 3 shows other heterogeneous computer systems of a content provider and an enterprise's EH&S system. EH&S system 900 is connected to content provider 901 via an internet connection. Communication can be carried out using different communication protocols, for example, HTTP, HTTPS, FTP, and other communication protocols. Communication between the OCC 903 and the EH&S core system 904 can be carried out using a remote function call (RFC) protocol. The remote function call protocol can be function orientated and can be the standard protocol in the SAP environment to communicate between different systems.

The OCC 903 is connected with a mapping database 920. The mapping database 920 can, for example, be a relational database, which allows saving mapping relations. The mapping database can, for example, be installed on a central folder to be shared by multiple users, or locally for exclusive access of each single user. The mapping itself and product specific filter settings can be stored within separate database files. The mapping rules can be stored centrally, whereas filter settings for users can be stored locally. Within the mapping database, rules for mapping internal and external identifications of products can be specified. The mapping database can store several tables, each defining mapping rules for different identifications.

One table can store, for example, a mapping of external property IDs onto internal property IDs. Another table can store mapping of external characteristic and identifier IDs onto internal characteristic and identifier IDs. A further table can, for example, store mapping of external phrases onto internal phrases. Another table can, for instance, store filters for already imported product data.

Static mapping information can, for instance, be stored separately from the dynamic data. Multiple users can share the static mapping information in a common database, while having the individual filter settings saved individually.

When accessing data from the content provider 901, the product data is provided via a network to OCC 903, for instance in an XML file format. OCC 903 receives from mapping database 920 the respective mapping rules. The mapping rules are applied onto the product data and the data is mapped onto a data format supported within the EH&S core system 904. The mapped information can be transferred to EH&S core system 904 through RFC procedures.

Figure 4:
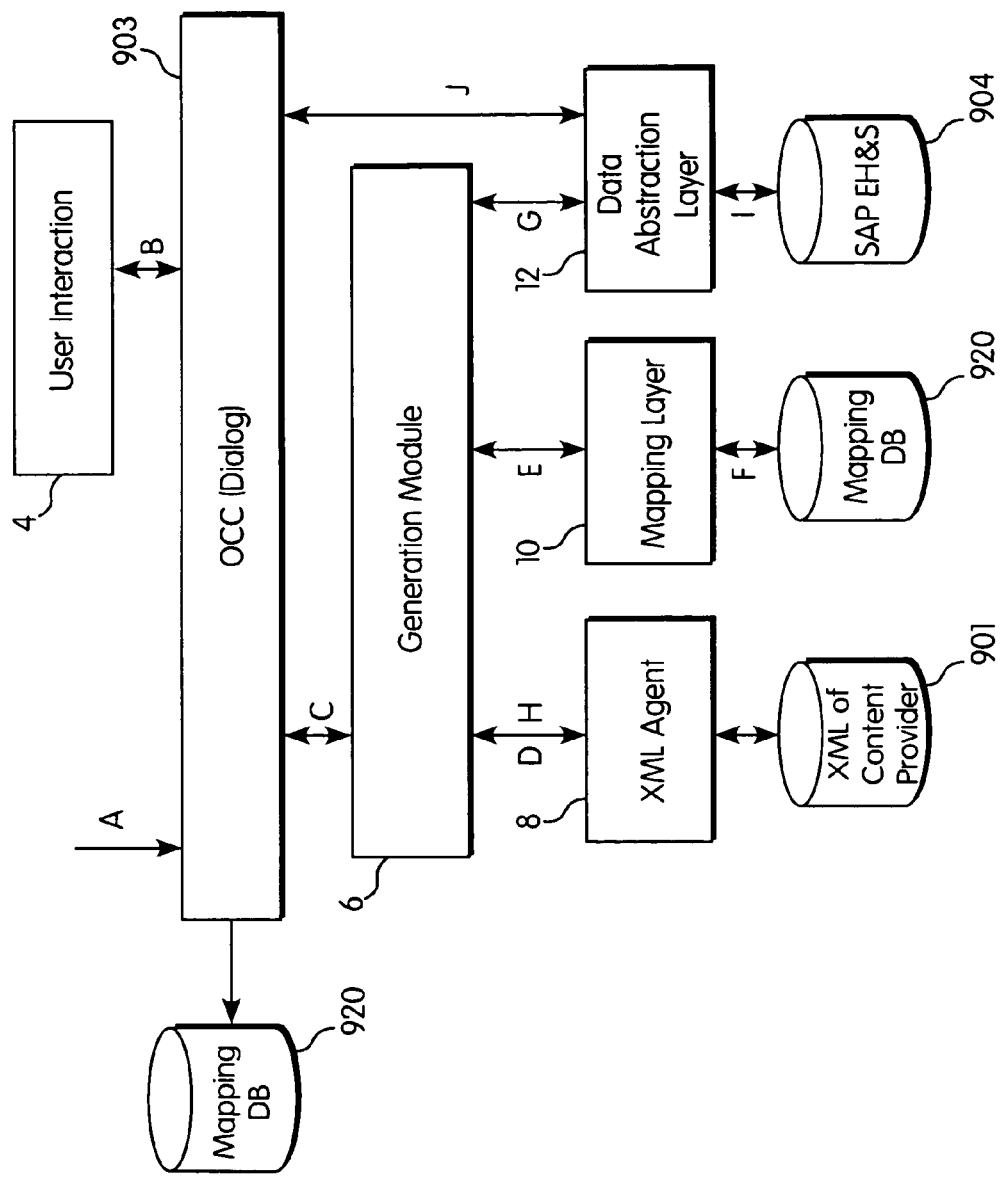
FIG. 4 shows the layers of software components for implementing an open content interface.

FIG. 4 shows the layers of software components for implementing an open content interface. The communication between the layers, when accessing data, is depicted by the arrows. Depicted are a user interface 4, the OCC 903 comprising a dialog interface, a generation module 6, an XML agent 8, a mapping layer 10, a data abstraction layer 12, content provider 901, mapping database 920 and EH&S core system 904.

In a first step A, the EH&S core system triggers the OCC 903 to retrieve substances from a content provider 901. The OCC 903 can receive a header XML file from content provider 901. The header XML file can comprise a substance list with all available products. In addition, the header XML file can specify properties available from the content provider and the corresponding generic information. By providing the header XML file to the OCC 903, users can chose products to be imported.

The header XML can, for instance, consists of two sections. One section can comprise the available content, which allows presenting users generic properties and regulatory list information. The second section can comprise available substances, which allows presenting users a list of all substances provided by the content provider. By using the header XML file, OCC 903 can dynamically generate a user interface for each product or for selecting required products from all available products. In a user dialog B the user can select from the available content. The user can also select, which information about a product should be imported. This can be done by setting user filters, which filters allow selecting from the available information the information which is required.

After having selected a particular product, the OCC 903 starts C the generation module 6 for retrieving information about the selected product. For every product, characteristic or property, a new object can be created in the data abstraction layer 6.

After the object is created, the XML agent is asked D to deliver the required data from the content provider 901. The data is loaded from the content provider 901 and provided to the mapping layer E. The mapping layer loads mapping rules from mapping database 920 and maps the external data onto the EH&S data format F.

If necessary, the data abstraction layer 12 can read additional data available from the EH&S core system 4 G.

After having read the product data, the XML agent 8 can also read the substance and regulatory data from the content provider 901 and return this data to generation module 6. Having the product data, the product information, and the additional information available, generation module 6 can write the external data to the internal structure of the data abstraction layer 12 I. The data from the content provider 901 and the EH&S core system 904 can now be presented to the user J by a dialog, where the user can select the information to be imported or updated. After having selected particular data, the data abstraction layer 12 imports and updates the data within the EH&S core system 904.

The product information can be stored in an XML file format, which can contain the content provided for one product. This XML file can, for instance, include identifiers, properties/objects, instances, usage, sources, user-define text, and hazard inducers, or any other information.

Mapping rules can be stored within a mapping XML file. The mapping XML file can enable the provider to provide a standard mapping for his content. The mapping XML file can represent a simplified form of the mapping database. OCC 903 can process the mapping XML file and can create the mapping rules for mapping the data onto the internal data. Loading new products into the EH&S core system 904 is depicted within FIGS. 5 and 6.

Figure 5:
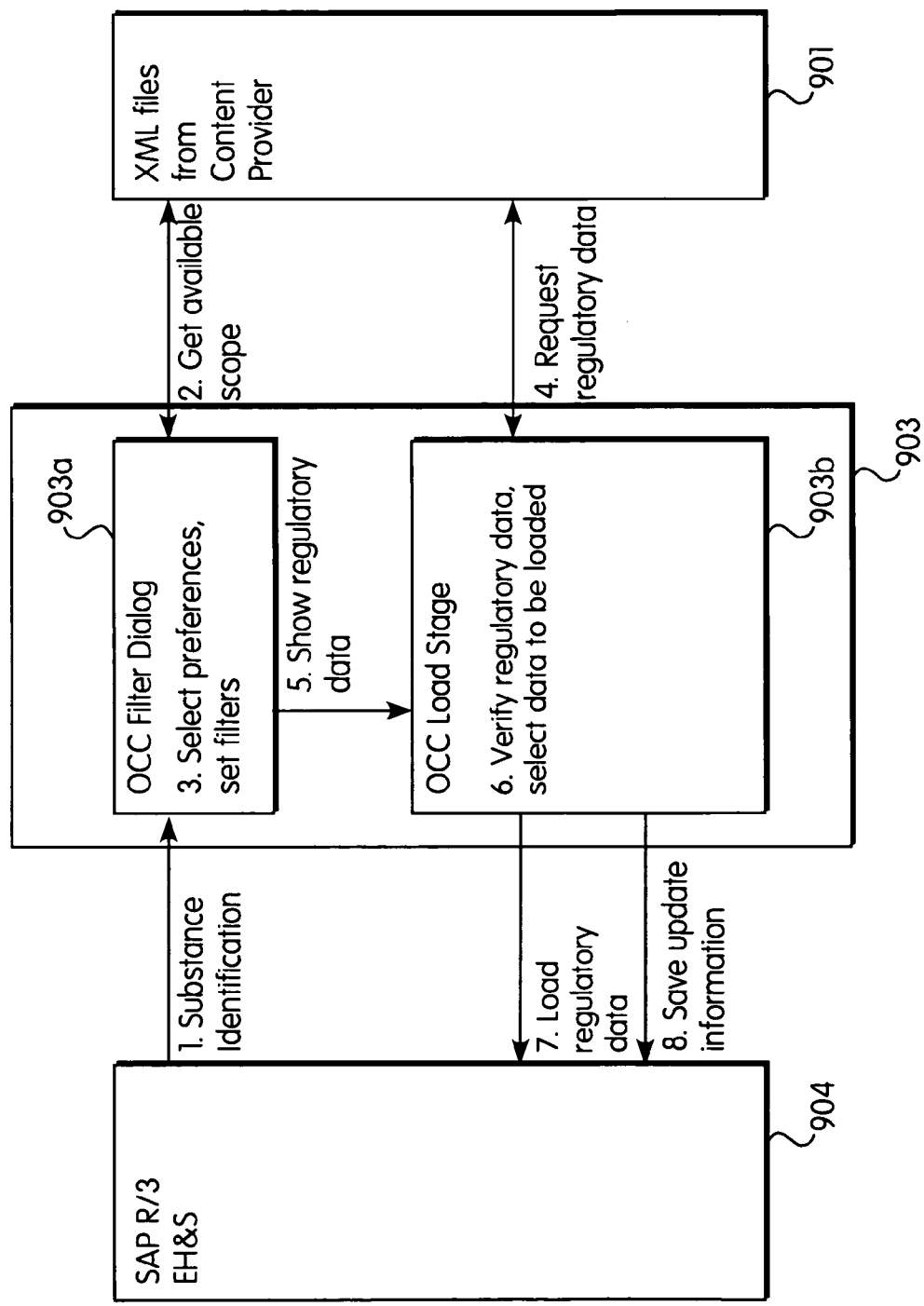
FIG. 5 shows a diagram representing message flows between components.

FIG. 5 shows a diagram representing message flows between components during an operation that loads a new product into the EH&S system. Depicted are EH&S core system 904, OCC 903, and content provider 901. OCC 903 comprises an OCC filter dialog component 903*a* and a OCC load stage component 903*b*.

When a user has created a new list of products, this list is passed from EH&S core system 904 to OCC filter dialog component 903*a*. OCC filter dialog component 903*a* requests from content provider 901 an header XML file comprising available substances. After having parsed the header XML file, the available data is presented to the user. The user can select the products to be updated. The user can also select for the selected products the content to be loaded.

In case regulatory data needs to be loaded from content provider 901, these are requested from content provider 901. Content provider 901 provides a content XML file comprising product information in an XML file format. OCC load stage component 903*b* maps the regulatory data onto the data of EH&S core system 904. The mapped data can then be loaded into EH&S core system 904. Eventually, update information can be saved.

Figure 6:
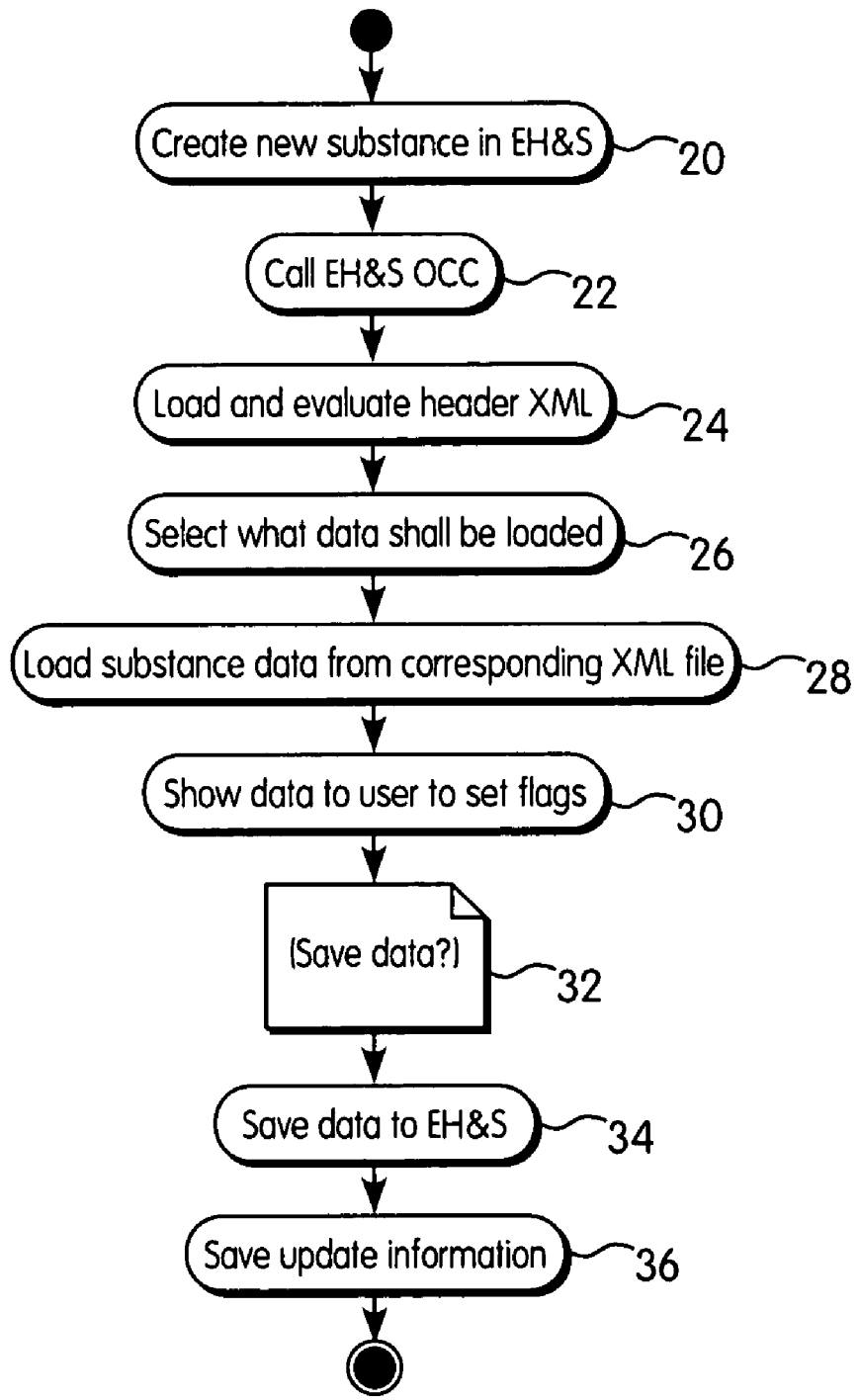
FIG. 6 shows a method for loading a substance in an EH&S system.

A flowchart according to FIG. 6 shows a method for loading a new product into the database of the EH&S system. In a first step, a new product is created 20 in the EH&S core system. The OCC is requested to get data for the created product 22. A header XML file is loaded from the content provider and evaluated 24. The information from the header XML file is parsed and the user is presented the available data 26. After user selection, the product data is loaded from the content provider using a Content XML file 28. The retrieved data is presented to the user 30. The user can set flags defining filter rules for filtering certain information of the particular product. The data can be saved according to user selection 32. If selected by a user, the data is mapped onto the EH&S product data format and saved within the EH&S database 34. For updating the product and applying filter rules for future download, the update information can also be stored 36.

Figure 7:
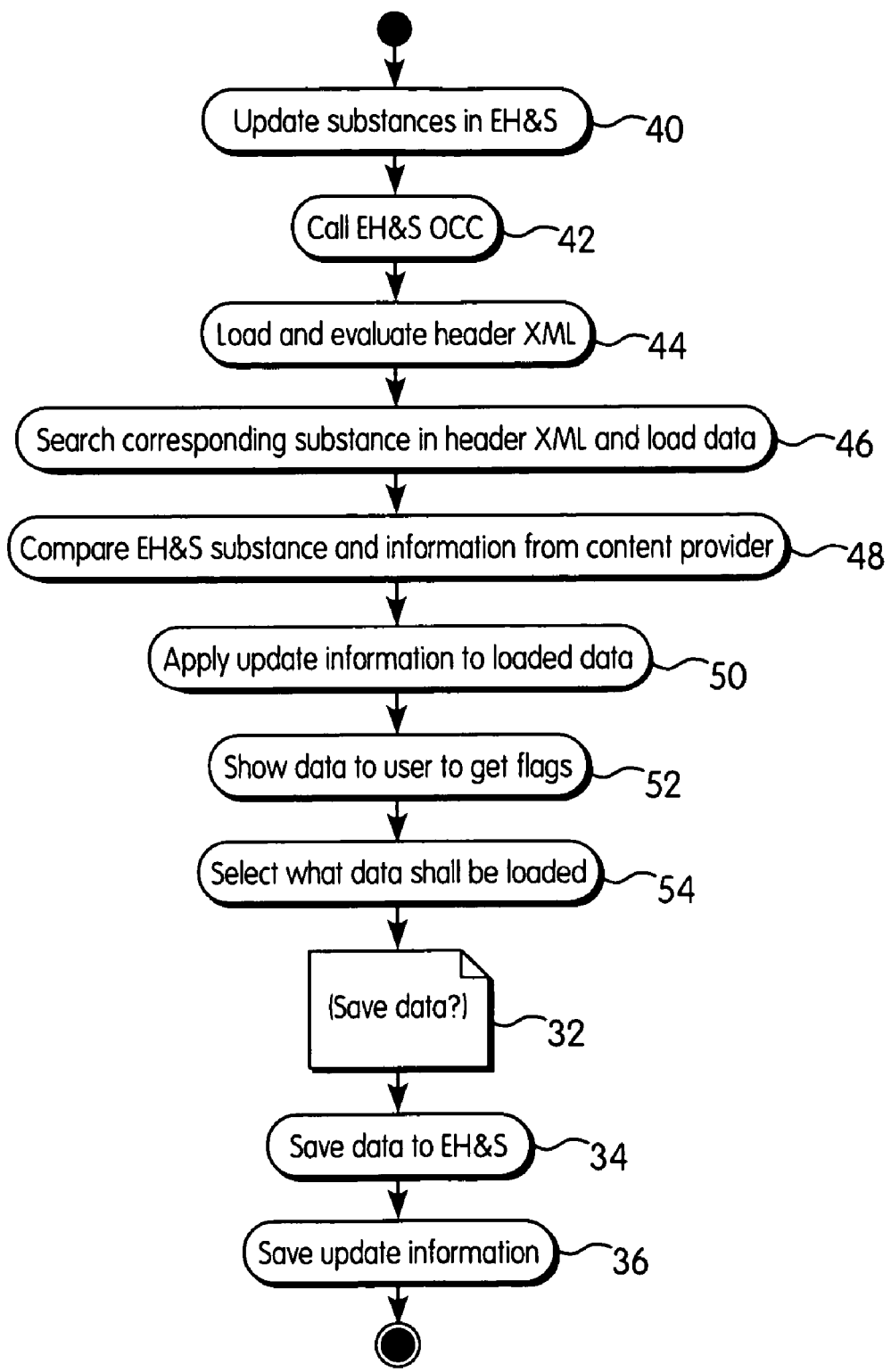
FIG. 7 shows a method for updating a substance in the EH&S system.

FIG. 7 shows a flowchart for updating already existing products.

First, products to be updated are selected 40. The selected products are provided to OCC 42. OCC loads a header XML file from content provider 44. The header XML file is parsed. A user can select the available content for a certain product within a user dialog. In addition, a generic filter rule can be applied to select certain content from the available content of each product. It can be checked, whether the corresponding substance is comprised within the header XML file and available to be downloaded 46. The header XML file as well allows generating the user dialog dynamically, based on the available information from the respective content provider.

After downloading the content XML file, it is parsed and mapped onto the data format of the EH&S core system. After mapping, it is checked, whether the product information corresponds to the already available product information in the EH&S core system 48.

In case new information is available, the product information is updated and loaded into the EH&S core system 50.

The user is presented all available information 52. From the available information, the user can select the ones which are required 54. User selections can be saved and the mapped data can be stored within the EH&S core system 32, 34. Thereafter, update information can be stored 36.

FIGS. 8*a* and 8*b* shows examples of the content of a header XML file. The header XML file can include meta data 8*a*, and substance data 8*b*. Meta data 8*a* can include generic information about product properties, identifiers, regulatory list sources, and other information. This meta data can be are generic information for products. The list of available substances data 8*b* can comprise information about all substances, which are available from the particular content provider. The list of substances can as well comprise links to the product data. The product data can be stored within a database of the content provider.

Figure 9B:
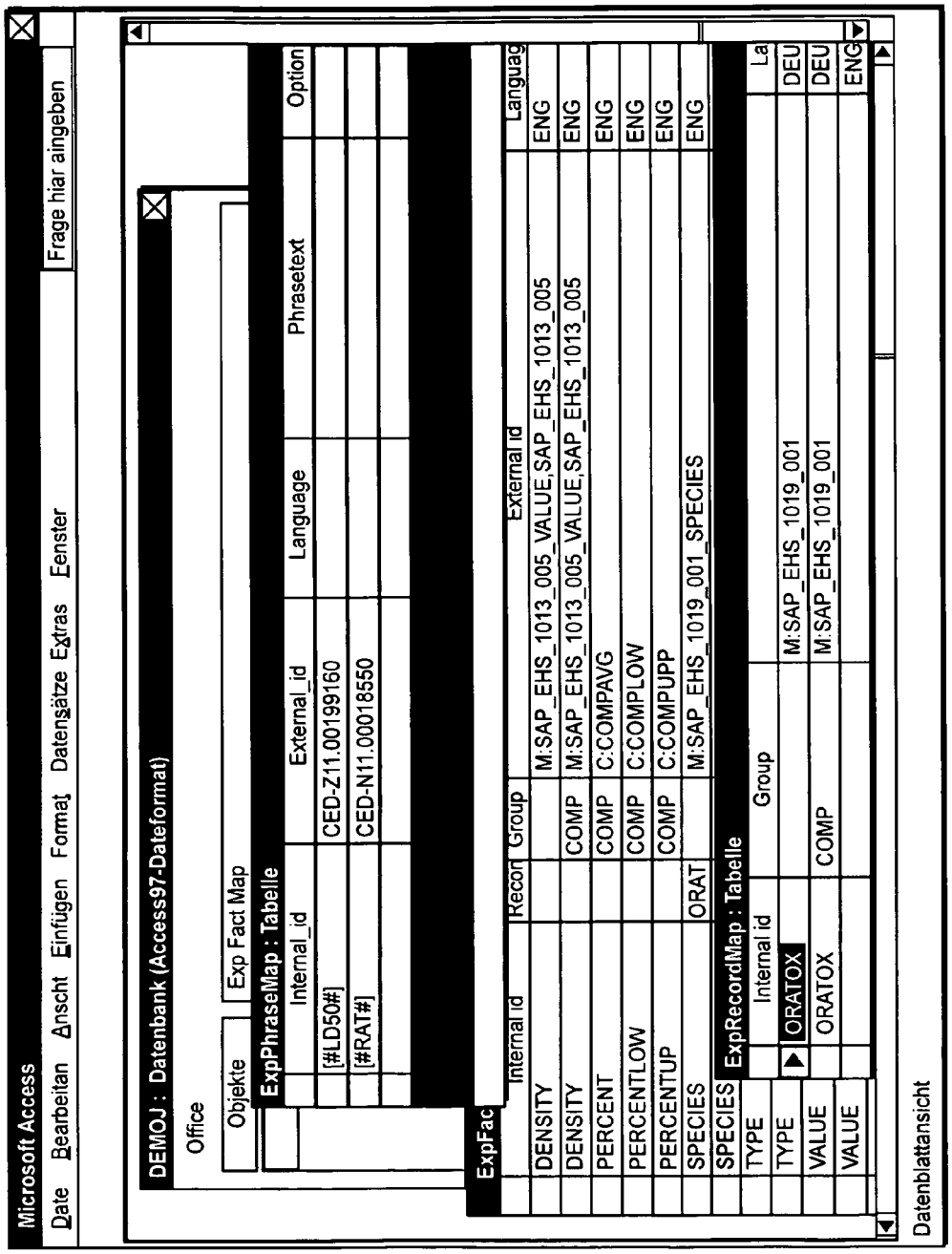
FIG. 9*b* shows an example of a screen shot of a user interface showing a representation of the mapping XML file

FIG. 9*a* shows an example of the content of a mapping XML file and FIG. 9*b* shows a screen shot of a user interface for this mapping XML file. The mapping XML file enables mapping of external IDs onto internal IDs. The file can represent a simplified form of the mapping database. With the mapping XML file, full featured mapping rules can be imported into the mapping database. The mapping XML file can represent rules for mapping external IDs onto internal IDs. Shown in screen shot 9*b* are different mapping tables. These mapping tables can comprise mapping information for mapping properties, characteristics, identifiers, phrases, or any other information from external sources onto internal sinks. The internal IDs and the external IDs are shown within separate columns of the tables. Users can see the mapping rules.

FIG. 10 shows content XML file comprising content provided for the particular product. This file can include identifiers, properties, objects, instances, usage, sources, user-define text, hazard induces, or any other available information for the particular product identification.

Figure 11:
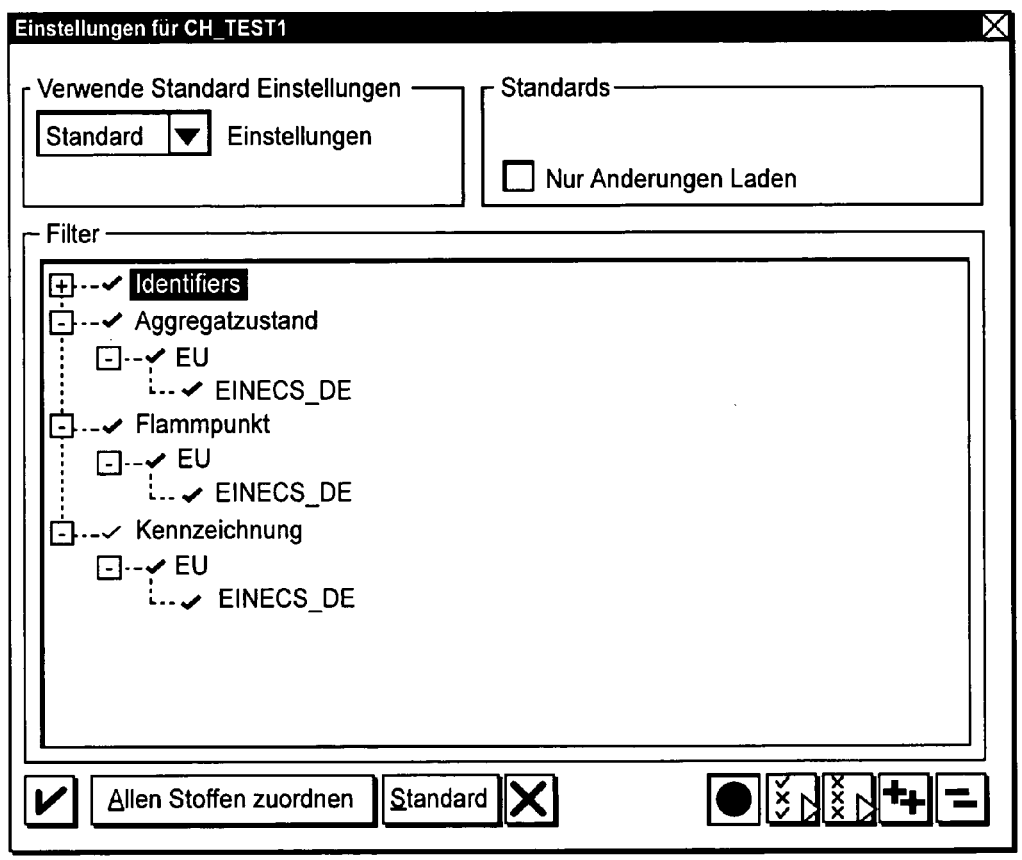
FIG. 11 shows a screen shot of a filter dialog for specifying product filters.

FIG. 11 shows a user filter dialog for a particular product. This dialog can be dynamically generated from the header XML file. It can be analyzed, which data for products are available Users can select from the available data the required one for the particular product. These filter rules can be based on user selections or loaded as a generic filter. The header XML file allows selecting the required data to be uploaded from the content provider into the EH&S database.

For allowing mapping external data onto internal databases, a data format of external sources is analysed and mapping rules are generated. After generation of mapping rules, the external data format can be used for downloading updated product information.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other and typically interact through a communication network. The relationship of client and server arises by virtue of computer programs running on the respective computers and having a client-server relationship to each other. The invention has been described in terms of particular embodiments, but other embodiments can be implemented and are within the scope of the following claims. For example, the operations of the invention can be performed in a different order and still achieve desirable results. As one example, the process depicted in FIGS. 9 and 10 may not require the particular order shown, or sequential order, to achieve desirable results. In certain implementations, multitasking and parallel processing may be preferable. Other embodiments are within the scope of the following claims.

What is claimed is:

1. A computer-implemented method for importing product data into a database that stores the product data in a first format, wherein the product data is available from a content provider in a second format that is content-provider-specific, the method comprising:
 receiving, at an import interface associated with the database, a mapping file that defines one or more mappings associated with the second format;
 generating mapping rules for mapping a data structure corresponding to the second format to a data structure corresponding to the first format, wherein the mapping rules are generated using the mapping file, and wherein the mapping rules comprise one or more rules for mapping text for product data in the second format to different text for product data in the first format that conveys at least some of the same information as the text for product data in the second format;
 receiving product data from the content provider via the import interface of the database, the received product data having the second format; and
 importing the received product data into the database using the mapping rules;
 wherein the mapping file comprises a header file comprising metadata that relates to product data in the second format.

2. A computer-implemented method for importing product data into a database that stores the product data in a first format, wherein the product data is available from a content provider in a second format that is content-provider-specific, the method comprising:
 receiving, at an import interface associated with the database, a mapping file that defines one or more mappings associated with the second format;
 generating mapping rules for mapping a data structure corresponding to the second format to a data structure corresponding to the first format, wherein the mapping rules are generated using the mapping file, and wherein the mapping rules comprise one or more rules for mapping text for product data in the second format to different text for product data in the first format that conveys at least some of the same information as the text for product data in the second format;
 receiving product data from the content provider via the import interface of the database, the received product data having the second format; and
 importing the received product data into the database using the mapping rules;
 wherein the mapping file is in a markup-language file format.

3. A computer-implemented method for importing product data into a database that stores the product data in a first format, wherein the product data is available from a content provider in a second format that is content-provider-specific, the method comprising:
 receiving, at an import interface associated with the database, a mapping file that defines one or more mappings associated with the second format;
 generating mapping rules for mapping a data structure corresponding to the second format to a data structure corresponding to the first format, wherein the mapping rules are generated using the mapping file, and wherein the mapping rules comprise one or more rules for mapping text for product data in the second format to different text for product data in the first format that conveys at least some of the same information as the text for product data in the second format;
 receiving product data from the content provider via the import interface of the database, the received product data having the second format;
 importing the received product data into the database using the mapping rules;
 configuring a filter for selecting a scope of product data to be imported; and
 storing the filter and the mapping rules separately.

4. The computer-implemented method of claim 1, 2, or 3, further comprising:
 tracking selections of data;
 storing tracked user selections; and
 displaying stored user selections in a process for updating the database.

5. The computer-implemented method of claim 1, 2, or 3, wherein the received product data comprises information relating to at least one of substances, pharmaceuticals, chemicals, safety information, hazardous material management, dangerous goods, physical chemical information, list substances, and regulatory content.

6. The computer-implemented method of claim 1, 2, or 3, wherein the mapping file is received from the content provider.

7. The computer-implemented method of claim 1, 2, or 3, wherein the product data received from the content provider comprises a file comprising data for one product.

8. The computer-implemented method of claim 1, 2, or 3, further comprising, in the import interface:
 parsing the received product data; and
 validating a format of the received product data.

9. The computer-implemented method of claim 1, 2, or 3, further comprising:
 receiving a selection that corresponds to product data to be imported into the database, the selection corresponding to the received product data.

10. A computer system for importing product data from a content provider that keeps product data in a second format that is content-provider-specific, the computer system comprising:
 a database for storing product data in a first format; and
 an import interface in communication with the database and configured to receive product data from a content provider;
 wherein the import interface is configured to:
  receive a mapping file that defines one or more mappings associated with the second format;
  generate mapping rules for mapping a data structure corresponding to the second format to a data structure corresponding to the first format, wherein the mapping rules are generated using the mapping file, and wherein the mapping rules comprise one or more rules for mapping text for product data in the second format to different text for product data in the first format that conveys at least some of the same information as the text for product data in the second format;
  receive product data from the content provider, the received product data having the second format; and
  import the received product data into the database using the mapping rules;
  wherein the mapping file comprises a header file comprising metadata that relates to product data in the second format.

11. A computer program product tangibly embodied in one or more machine-readable storage media, the computer program product comprising instructions that are executable to import product data into a database that stores the product data in a first format, wherein the product data is available from a content provider in a second format that is content-provider-specific, the instructions for:

receiving, at an import interface associated with the database, a mapping file that defines one or more mappings associated with the second format;

generating mapping rules for mapping a data structure corresponding to the second format to a data structure corresponding to the first format, wherein the mapping rules are generated using the mapping file, and wherein the mapping rules comprise one or more rules for mapping text for product data in the second format to different text for product data in the first format that conveys at least some of the same information as the text for product data in the second format;

receiving product data from the content provider via the import interface of the database, the received product data having the second format; and importing the received product data into the database using the mapping rules;

wherein the mapping file comprises a header file comprising metadata that relates to product data in the second format.

12. A computer program product tangibly embodied in one or more machine-readable storage media, the computer program product comprising instructions that are executable to import product data into a database that stores the product data in a first format, wherein the product data is available from a content provider in a second format that is content-provider-specific, the instructions for:

receiving, at an import interface associated with the database, a mapping file that defines one or more mappings associated with the second format;

generating mapping rules for mapping a data structure corresponding to the second format to a data structure corresponding to the first format, wherein the mapping rules are generated using the mapping file, and wherein the mapping rules comprise one or more rules for mapping text for product data in the second format to different text for product data in the first format that conveys at least some of the same information as the text for product data in the second format;

receiving product data from the content provider via the import interface of the database, the received product data having the second format; and importing the received product data into the database using the mapping rules;

wherein the mapping file is in a markup-language file format.

13. A computer program product tangibly embodied in one or more machine-readable storage media, the computer program product comprising instructions that are executable to import product data into a database that stores the product data in a first format, wherein the product data is available from a content provider in a second format that is content-provider-specific, the instructions for:

receiving, at an import interface associated with the database, a mapping file that defines one or more mappings associated with the second format;

generating mapping rules for mapping a data structure corresponding to the second format to a data structure corresponding to the first format, wherein the mapping rules are generated using the mapping file, and wherein the mapping rules comprise one or more rules for mapping text for product data in the second format to different text for product data in the first format that conveys at least some of the same information as the text for product data in the second format;

receiving product data from the content provider via the import interface of the database, the received product data having the second format;

importing the received product data into the database using the mapping rules;

configuring a filter for selecting a scope of product data to be imported; and storing the filter file and the mapping rules separately.

14. The computer program product of claim 11, 12, or 13, further comprising instructions for:

tracking selections of data;

storing tracked selections; and displaying stored selections in a process for updating the database.

15. The computer program product of claim 11, 12, or 13, wherein the received product data comprises information relating to at least one of substances, pharmaceuticals, chemicals, safety information, hazardous material management, dangerous goods, physical chemical information, list substances, and regulatory content.

16. The computer program product of claim 11, 12, or 13, wherein the mapping file is received from the content provider.

17. The computer program product of claim 11, 12, or 13, wherein the product data received from the content provider comprises a file comprising data for one product.

18. The computer program product of claim 11, 12, or 13, further comprising instructions for:

parsing the received product data; and validating a format of the received product data.

19. The computer program product of claim 11, 12, or 13, further comprising instructions for:

receiving a selection that corresponds to product data to be imported into the database, the selection corresponding to the received product data.

20. A computer system for importing product data from a content provider that keeps product data in a second format that is content-provider-specific, the computer system comprising:

a database for storing product data in a first format; and an import interface in communication with the database and configured to receive product data from a content provider;

wherein the import interface is configured to:

receive a mapping file that defines one or more mappings associated with the second format;

generate mapping rules for mapping a data structure corresponding to the second format to a data structure corresponding to the first format, wherein the mapping rules are generated using the mapping file, and wherein the mapping rules comprise one or more rules for mapping text for product data in the second format to different text for product data in the first format that conveys at least some of the same information as the text for product data in the second format;

receive product data from the content provider, the received product data having the second format; and import the received product data into the database using the mapping rules;

wherein the mapping file is in a markup-language file format.

21. A computer system for importing product data from a content provider that keeps product data in a second format that is content-provider-specific, the computer system comprising:

a database for storing product data in a first format; and
an import interface in communication with the database and configured to receive product data from a content provider;
wherein the import interface is configured to:
receive a mapping file that defines one or more mappings associated with the second format;
generate mapping rules for mapping a data structure corresponding to the second format to a data structure corresponding to the first format, wherein the mapping rules are generated using the mapping file, and wherein the mapping rules comprise one or more rules for mapping text for product data in the second format to different text for product data in the first format that conveys at least some of the same information as the text for product data in the second format;
receive product data from the content provider, the received product data having the second format;
import the received product data into the database using the mapping rules;
configure a filter for selecting a scope of product data to be imported; and
store the filter and the mapping rules separately.

22. The computer system of claim 10, 20, or 21, wherein the received product data comprises information relating to at least one of substances, pharmaceuticals, chemicals, safety information, hazardous material management, dangerous goods, physical chemical information, list substances, and regulatory content.

23. The computer system of claim 10, 20, or 21, wherein the mapping file is received from the content provider.

24. The computer system of claim 10, 20, or 21, wherein the product data received from the content provider comprises a file comprising data for one product.

25. The computer system of claim 10, 20, or 21, wherein the import interface is further configured to:
parse the received product data; and
validate a format of the received product data.

26. The computer system of claim 10, 20, or 21, wherein the import interface is further configured to:
receive a selection that corresponds to product data to be imported into the database, the selection corresponding to the received product data.

* * * * *